US 8,548,268 B2

(12) United States Patent
Della Vedova et al.

(10) Patent No.: US 8,548,268 B2
(45) Date of Patent: Oct. 1, 2013

(54) DEVICE TO ANALYZE AND DETERMINE THE MOVEMENT CHARACTERISTICS OF PRODUCTS, IN PARTICULAR IN A CASTING LINE, AND RELATIVE METHOD

(75) Inventors: Ferruccio Della Vedova, Pozzuolo del Friuli (IT); Lorenzo Ciani, Udine (IT)

(73) Assignee: Danieli Automation SpA, Buttrio (UD) (IT)

( * ) Notice: Subject to any disclaimer, the term of this patent is extended or adjusted under 35 U.S.C. 154(b) by 311 days.

(21) Appl. No.: 13/024,353

(22) Filed: Feb. 10, 2011

(65) Prior Publication Data

US 2011/0200231 A1 Aug. 18, 2011

(30) Foreign Application Priority Data

Feb. 11, 2010 (IT) .............................. UD2010A0026

(51) Int. Cl.
*G06K 9/64* (2006.01)
(52) U.S. Cl.
USPC ........... 382/278; 382/141; 382/142; 382/143; 382/280; 382/294
(58) Field of Classification Search
USPC .......................... 382/141–143, 278, 280, 294
See application file for complete search history.

(56) References Cited

U.S. PATENT DOCUMENTS

| 3,508,066 A | * | 4/1970 | Agar | 356/28 |
| 3,824,015 A | * | 7/1974 | Petit et al. | 356/28 |
| 4,162,509 A | * | 7/1979 | Robertson | 356/28 |
| 4,580,894 A | * | 4/1986 | Wojcik | 356/28 |
| 5,149,980 A | * | 9/1992 | Ertel et al. | 250/559.32 |
| 5,586,063 A | * | 12/1996 | Hardin et al. | 702/142 |
| 6,118,132 A | * | 9/2000 | Tullis | 250/559.39 |
| 7,146,049 B2 | * | 12/2006 | Flotats et al. | 382/218 |
| 8,080,131 B2 | * | 12/2011 | Soderberg | 162/198 |
| 2004/0169131 A1 | | 9/2004 | Hardin et al. | |
| 2006/0171725 A1 | * | 8/2006 | Ruthenberg et al. | 399/16 |
| 2008/0137095 A1 | * | 6/2008 | Chen et al. | 356/498 |
| 2010/0181039 A1 | | 7/2010 | Soderberg | |
| 2010/0225931 A1 | | 9/2010 | Jokinen | |

FOREIGN PATENT DOCUMENTS

| DE | 202008004940 U1 | 8/2009 |
| EP | 1067388 A1 | 1/2001 |
| WO | 9853327 A1 | 11/1998 |

(Continued)

OTHER PUBLICATIONS

Design and control—vision, Schiehlen et al., IEEE, Sep. 12-16, 1994, pp. 2058-2063.*

(Continued)

*Primary Examiner* — Jayesh A Patel
(74) *Attorney, Agent, or Firm* — Panitch Schwarze Belisario & Nadel LLP

(57) ABSTRACT

A device to analyze and determine the movement characteristics of products moving in a determinate direction of feed (F) and emitting radiations, in particular products exiting from a casting line, comprises a camera to continuously acquire images of the product moving in the direction of feed (F) in at least two successive instants of time, and an electronic processing unit by means of which the comparison between at least two successive images acquired is carried out, using mathematical algorithms based on the image correlation principle, in order to determine the spatial displacement of the images and then the movement characteristics of the product moving in the direction of feed (F) are analyzed and determined.

10 Claims, 6 Drawing Sheets

(56) References Cited

FOREIGN PATENT DOCUMENTS

| WO | WO9853327 | * | 11/1998 |
| WO | 2007/085704 A1 | | 8/2007 |
| WO | WO 2007085704 A1 | * | 8/2007 |
| WO | 2009/008814 A1 | | 1/2009 |
| WO | WO 2009008814 A1 | * | 1/2009 |

OTHER PUBLICATIONS

Prelimnary analysis of conveyor—applications., Jane Shi., ACM, 978-1-60558-293-1/08, 2008, pp. 156-161.*

IT Search Report issued on Sep. 30, 2010 in IT Application No. UD20100026.

* cited by examiner

AIR IN ↑

WATER IN ↑   ↓ WATER OUT

DEVICE TO ANALYZE AND DETERMINE THE MOVEMENT CHARACTERISTICS OF PRODUCTS, IN PARTICULAR IN A CASTING LINE, AND RELATIVE METHOD

FIELD OF THE INVENTION

The present invention concerns a device, and the relative method, to analyze and determine the movement characteristics of oblong products, in particular although not exclusively, products exiting from a casting line, for example slabs or billets. The present invention can be applied, in particular, in measuring the speed, in detecting the movement along the direction of feed or the direction transverse to the direction of feed, in analyzing movements, displacements, vibrations or oscillations, both parallel and orthogonal to the direction of feed, of the moving oblong products, in particular also due to friction or anomalies in the functioning of the casting machine, the ingot mold and/or the mechanical system that guides and conveys the cast product.

BACKGROUND OF THE INVENTION

Within a steel casting process, for example to produce billets, there is a known need to measure the speed at which the product comes out of casting.

To this purpose, various solutions have been proposed, but they have often proved to be, for various reasons, unsuitable and/or not completely effective.

In particular, methods involving contact are known, for example based on measuring rolls, which are unadvisable given the high temperatures of the products in the casting line, giving rise to problems of slipping, heat dilation and wear which lead to a reduction in the accuracy of the measurements. In particular, the wear on the rolls causes inaccuracies in measuring the speed, just as the presence of sheets of scale determines alterations in the circumference traveled by the rolls and therefore, again, inaccuracies in the measurement.

Doppler effect laser measurers are also known, and therefore without contact, but these are costly and complex and, for low or negative speeds, need expensive acoustic-optical modulators. Doppler effect laser measurers also do not have the possibility of identifying horizontal and vertical movements, due to vibrations of the billet, which makes the measurements of speed unreliable when such vibrations occur.

Furthermore, the presence of sheets of scale or other surface irregularities on the cast product makes measuring with such devices unreliable, and therefore further discourages its use.

Document WO-A-98/53327 describes a method to measure without contact the linear movement of the surface of an object, which provides to calculate the correlation between two images of the moving object taken at successive times.

Document WO-A-2009/008814 describes a device to measure the speed of moving paper, and comprises a light source, an image acquisition element and a control unit that receives the images acquired and, by means of computational means, calculates the speed of the moving paper based on the correlation between the two images acquired.

Document WO-A-2007/085704 describes a method to measure the speed of a surface of a moving object that provides to detect the surface by means of detectors and to construct a response matrix based on the data detected by means of which it determines the speed of the moving surface.

Document U.S. Pat. No. 3,824,015 describes a method and the relative apparatus for the optical measurement of a moving product, such as a rolled metal product, which provides to use two means to detect the luminous energy coming from the product and mounted distanced by a desired distance on a support structure, which detect light signals in a temporally delayed manner one from the others, so as to form an image of the surface of the element of the product on each detection mean, and to generate a corresponding correlation function according to which the value of speed of the product can be calculated.

Purpose of the present invention is to achieve a device to analyze and determine the movement characteristics of oblong products, in particular exiting from a casting line, and to perfect a relative method, which allows, without contact, economically, reliably and accurately, to measure the speed, to detect the movement in the direction of feed or the direction transverse to the direction of feed, to analyze the movements, displacements, vibrations or oscillations, both parallel and orthogonal to the direction of feed of said moving oblong products.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, and according to a first feature of the present invention, a device to analyze and determine the movement characteristics of products in a determinate direction of feed and emitting radiations, for example of the infrared type, in particular products exiting from a casting line, comprises a camera suitable to acquire, continuously, images of the moving product at least two successive instants of time.

The two instants of time when the images are acquired are such that the two images taken by the camera are partly superimposed, that is, a second successive image contains at least part of what was taken in a previous first image.

The device provides an electronic processing unit, advantageously integrated into the camera, suitable to compare at least two consecutive images acquired, using mathematical algorithms based on the image correlation principle, to determine the spatial displacement or shift between the images and therefore to obtain information on the movement characteristics of the moving product.

With the present invention, in particular, it is possible to measure the speed of the product moving in the direction of feed.

Furthermore, the device according to the present invention can be used, reliably and accurately, to detect the movement in the direction of feed or the direction transverse to the direction of feed, and to analyze movements, displacements, vibrations or oscillations, both parallel and transverse or orthogonal to the direction of feed of the moving oblong products in question, also due to friction or functioning anomalies in the casting machine, the ingot mold and/or the mechanical system that guides and conveys the cast product.

The present invention has the advantage that it allows to analyze and determine the movement characteristics without contacting the product, as happens on the contrary with known measuring rolls, and therefore it is not affected by the problems deriving from said rolls in the state of the art.

Another advantage is the great accuracy and speed, and the simplicity of use of the present invention.

Moreover, unlike in the state of the art, the present invention exploits, as an innovative strong point, the natural presence of surface irregularities or dis-uniformities (scale, oxide stains, etc.) to analyze and determine the movement characteristics. In fact, the processing unit is advantageously configured to identify, among these surface irregularities or dis-uniformities, a reference detail in the images acquired and to assess the spatial displacement of said reference detail, comparing the two successive images with the correlation principle and therefore to detect the movement characteristics of the product.

Consequently, the more irregularities there are, the greater the reliability of the measurement according to the invention, although, for the correct functioning of the invention, the surface irregularity typical of a cast product exiting from the secondary cooling chamber of the continuous casting machine is sufficient.

Another advantage is that, with the present invention, it is possible to appreciate and assess possible displacements of the casting product in a transverse direction, generally orthogonal, to the direction of feed, also using this effect for the diagnosis that the casting process is developing correctly Advantageously, according to the present invention, it is possible to detect, during diagnostics, possible problems in the functioning of the casting line. Advantageously, this is done by analyzing the harmonic content of the signal obtained by the device according to the present invention.

In particular, the processing unit is configured to analyze in the frequencies domain, both in the direction of feed and in the direction transverse to the direction of feed, the signal of speed obtained by the device according to the present invention, and to identify:

the presence of a frequency component corresponding to the frequency of oscillation of the ingot mold of the associated casting machine and, assessing the amplitude thereof, to identify in this way the presence of possible anomalies due to an erroneous setting of the casting speed, erroneous conicity of the crystallizer and/or poor effectiveness of the lubrication, and/or the presence of a frequency component correlated to friction and/or anomalies in the mechanical system, generally consisting of rolls, that guides and conveys the cast product.

Moreover, the detection obtained with the present invention is very quick and this makes it possible to assess possible problems due to anomalous situations where the cast material shrinks, possible sticking of the steel in the mold, and generally any anomalies in the primary cooling.

In some forms of embodiment of the invention, the camera comprises, in particular, a sensor, for example of the CCD or CMOS type, and an optical system provided with a telecentric type lens that guarantees the enlargement of the image focused on the sensor of the camera is independent of the distance from the object, provided that the object, that is, the product moving in the direction of feed, remains in the optimum distance range for the functioning of the lens.

The advantage in using a telecentric lens is that it makes the analysis and determination of the movement characteristics independent of displacements transverse to the direction of feed by the moving cast product, such as a billet. In fact, whether it shifts along the height or along the depth, the enlargement factor of the image taken by the camera with respect to the object observed is always constant, and the moving product is always parallel to itself.

In some preferential forms of embodiment, the camera is configured to determine a desired field of vision through which a desired portion of the moving product can be observed.

In some forms of embodiment, the portion of the product observed by the camera, that is, the area of the moving product, seen from the measuring device through its field of vision, is smaller in size, in height and width, than the local sizes of the product in transit. This has the advantage that it reduces the calculation times, since the points to be considered in the images acquired are lower in number than all the possible points present in the local area of the moving product, but in any case there are a sufficient number of them to carry out the correlation, and hence the analysis, in a reliable manner.

In some forms of embodiment, the area observed by the camera through the field of vision is rectangular in shape, for example sized 48×36 mm. In other forms of embodiment, the shape of the area observed can be circular or other.

Within the framework of the present invention, it is important that the product moving in the direction of feed has a temperature high enough to be luminous, and therefore visible to the camera.

In some solutions of the present invention, it is possible to provide auxiliary lighting means, for example LED type lighting means, associated with the camera, in case the temperature of the moving product is not such as to produce radiations of the infrared type sufficient to be detected by the camera, so as to compensate in this way for the possible low temperature of the product moving in the direction of feed. In this way, it is also possible to analyze and determine the movement characteristics of products not emitting radiation, or emitting low radiation, for example cold products.

In particular, in some forms of embodiment, the device according to the present invention makes available to the outside the result of the measurement of the speed of the moving product, for example the billet, or other cast material, by means of an impulse train, in the same way and comparable with what an incremental encoder traditionally enabled.

Advantageously, counting the impulses also allows to know the quantity of material that has passed in front of the measuring device.

Consequently, in some forms of embodiment, the device according to the present invention can also become a device to measure the length and can replace, with improved performance, for example encoders normally mounted on the rollerways that draw the billet.

In some forms of embodiment, the measurement of the speed is made available toward the outside, in particular, thanks to the measurement of the frequency of impulses generated with a frequency correlated to the value of speed measured.

Alternatively, the information concerning speed and length can be read directly by data interface means, for example a Profibus port or equivalent port.

In some forms of embodiment the measuring device comprises a structure that houses the camera, which guarantees strength and protection, therefore suitable for installation in difficult industrial environments.

In some forms of embodiment, as well as the optional Profibus communication interface, a Fast Ethernet port may also be provided, for diagnostic purposes.

According to another aspect of the present invention, a method to analyze and determine the movement characteristics of products moving in a determinate direction of feed and emitting radiations, for example of the infrared type, in particular products exiting from a casting line, provides to acquire continuously and at successive instants a plurality of images—in some basic forms of embodiment even two acquisitions may be sufficient—of the product moving in the direction of feed whose speed is to be measured.

By comparing at least two successive images acquired, using mathematical algorithms based on the image correlation principle, the spatial displacement between the images is determined and therefore the movement characteristics of the product moving in the direction of feed, or the direction transverse to the direction of feed, are analyzed and determined.

In some forms of embodiment of the present invention, by determining the spatial displacement between the images, a signal is obtained correlated to the speed of the moving product, which is analyzed in the frequencies domain, so as to identify:

the presence of a frequency component corresponding to the frequency of oscillation of the ingot mold of the casting line and, assessing the amplitude of said frequency component identified, to identify in this way the presence of possible anomalies, in particular due to an erroneous setting of the casting speed, erroneous conicity of the crystallizer and/or poor effectiveness of the lubrication, or anomalies in the movement dynamics of the cast product, and/or the presence of a frequency component correlated to friction and/or anomalies in the mechanical system that guides and conveys the cast product.

In other variants of the present invention, the comparison step is performed on the basis of the natural presence of surface irregularities or dis-uniformities on the product, where, among these surface irregularities or dis-uniformities, a reference detail in the images acquired is identified and the spatial displacement of said reference detail is assessed, comparing the relative images by means of mathematical algorithms based on the image correlation principle and then the movement characteristics of the product are analyzed and determined.

The present invention can be used specifically in steel casting plants, but can also be used in similar applications every time it is desired to analyze movement characteristics, for example to know precisely the speed of a product that emits or radiates radiations, for example infrared, not necessarily moving in the direction of feed, provided that its luminosity and surface irregularity is such as to be seen by the camera.

Advantageously, with the present invention, the speed can be measured in both senses of the direction of feed of the moving product. Moreover, with the present invention, there are no lower limits to the absolute value of the speed of the product moving in the direction of feed: therefore the product can even stop in front of the camera so as to invert its direction of movement.

BRIEF DESCRIPTION OF THE DRAWINGS

These and other characteristics of the present invention will become apparent from the following description of a preferential form of embodiment, given as a non-restrictive example with reference to the attached drawings wherein.

Figure 1:
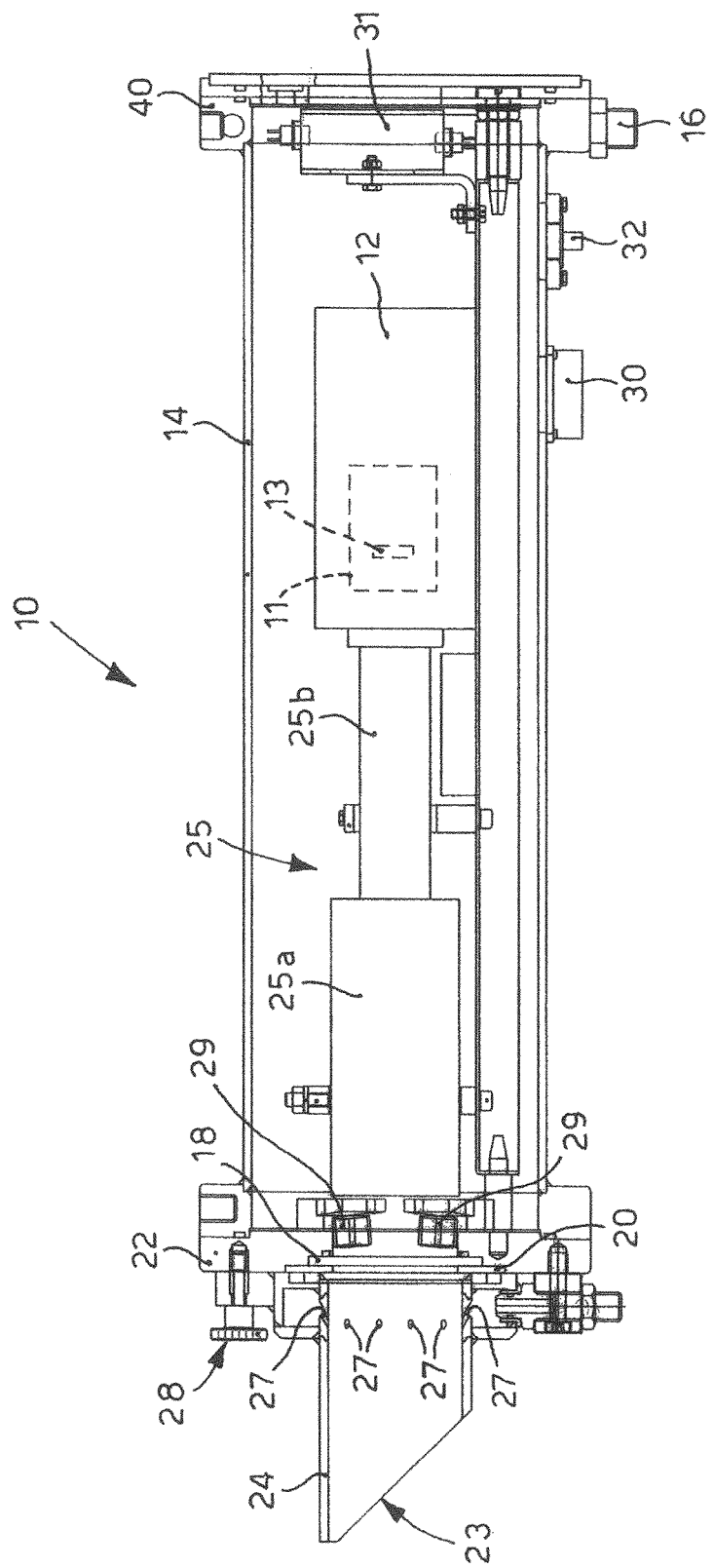
FIG. 1 is a schematic representation of a device to analyze and determine the movement characteristics of oblong products according to the present invention.

To facilitate comprehension, the same reference numbers have been used, where possible, to identify common elements in the drawings that are substantially identical. It is understood that elements and characteristics of one form of embodiment can conveniently be incorporated into other forms of embodiment without further clarifications.

DETAILED DESCRIPTION OF A PREFERENTIAL FORM OF EMBODIMENT

FIGS. 1, 2, 3 and 4 show a device 10 to analyze and determine the movement characteristics, or kinematics, of products 15 (FIGS. 8 and 9) exiting from a steel casting line, for example a billet 15. However, it should be remembered that the reference number 15 must not be understood as restrictive for the type of oblong product whose movement characteristics are to be analyzed. In fact, the same device 10 can be used with the same ends for other oblong products that are moving and emitting radiations, in this case of the infrared type, without departing from the field of the present invention.

The measuring device 10 comprises a camera 12 located in cooperation, advantageously along a common optical axis, with a lens 25 or analogous optical system.

In some forms of embodiment, the lens 25 is a telecentric lens, consisting of two different optics 25a, 25b located in series, between which there is a diaphragm. Using a lens 25 of the telecentric type allows to make the acquisition of the images independent of the distance between the device 10 and the billet 15.

Figure 9:
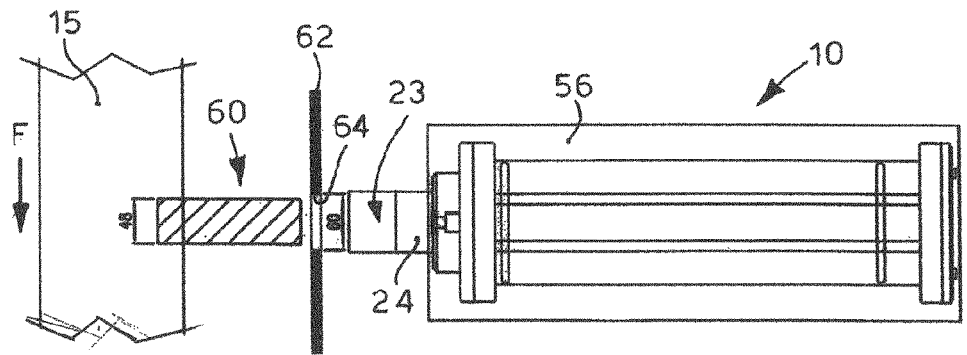
FIG. 9 is a plane schematic representation from above of the field of vision of the device according to the present invention.

The camera 12 is suitable to acquire a plurality of images at least two successive instants of time of the billet 15 moving in a determinate direction of feed, indicated by the arrow F in FIG. 9.

Figure 10:
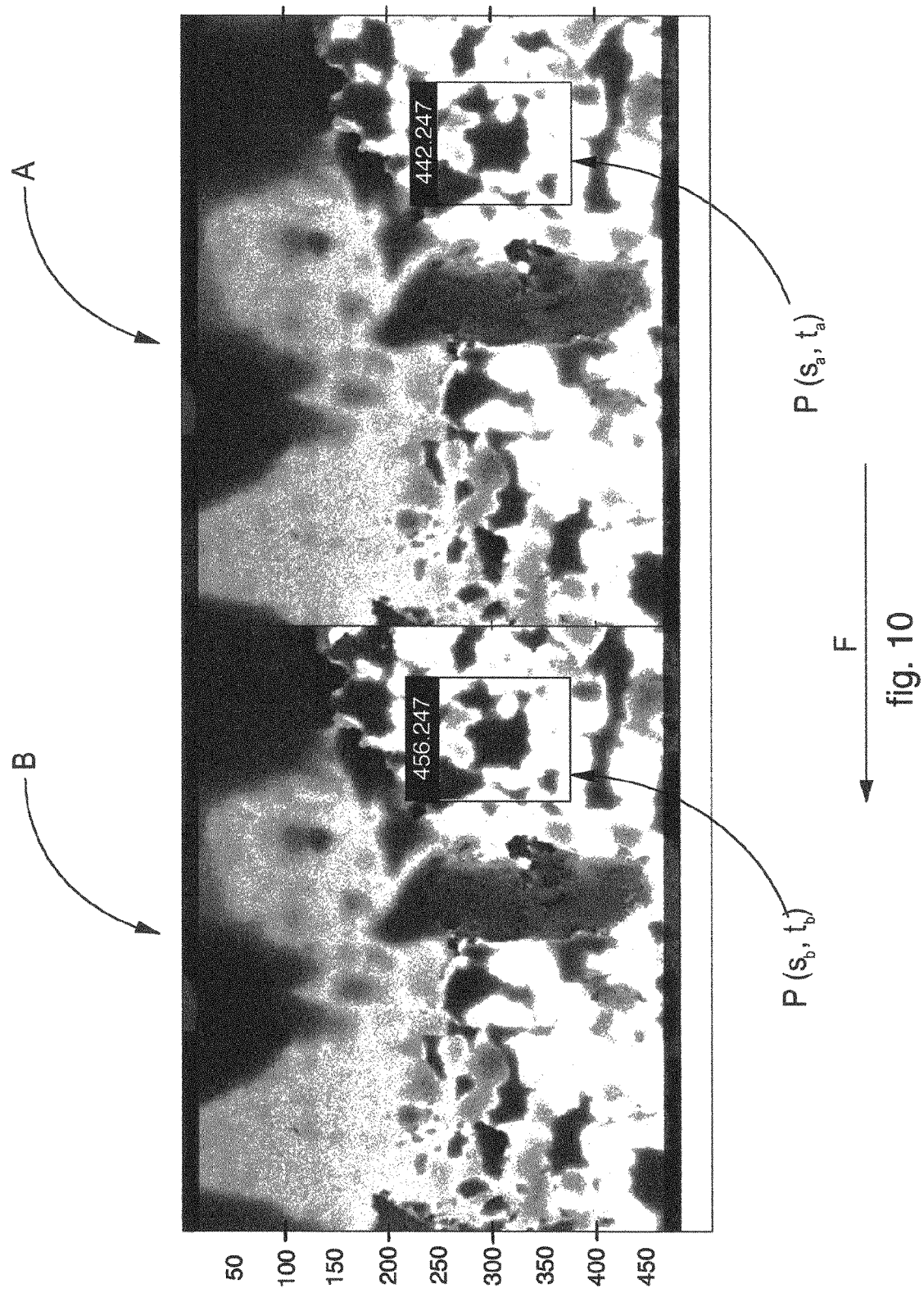
FIG. 10 shows two images acquired at successive instants in time using the device according to the present invention.

The two instants of time when the images are detected are such that the two images taken by the camera 12 are partly superimposed, that is, a second successive image contains at least part of what is taken in the first previous image, as can be seen quite clearly in FIG. 10.

In some forms of embodiment, the camera 12 is preferably of the so-called smart camera type, and is provided with a sensor, for example of the CCD or CMOS type, in this case sensitive to the infrared radiations coming from the billet 15, or product in general. The electric signals of the sensor are processed by an electronic processor 11 integrated into the camera 12. Advantageously, the processor 11 is a personal computer PC integrated into the camera 12, in which an embedded operating system is installed, for example Windows XP Embedded O.S., which allows to have all the advantages connected to using a standard system (file management, standard ports, etc.).

The camera 12 photographs at successive moments the billet 15 whose movement characteristics are to be measured and analyzed.

From the comparison of two successive images and using mathematical algorithms based on the image correlation principle, the processor 11 determines the spatial displacement between two images and then analyzes and determines the movement characteristics of the billet 15, for example it measures its speed and assesses its movements and displacements transverse to the direction of feed F.

In particular, in some forms of embodiment, the speed value is made available to the outside as a train of impulses produced by an impulse generator 13 (FIG. 1) in the camera 12, which impulses are generated with a frequency correlated to the speed value calculated by the processor 11. By counting the impulses, using an external counter 17 (FIG. 2), it is possible to know the quantity of material that has passed through, and hence the measurement of the length of the billet 15, while the frequency of the impulses supplies to the outside the measurement of the speed of feed of the billet 15.

In the embodiment shown in the attached drawings, the camera 12 is housed in a container 14 made of aluminum or other material, metal or non-metal, suitable for the purpose.

Figure 2:
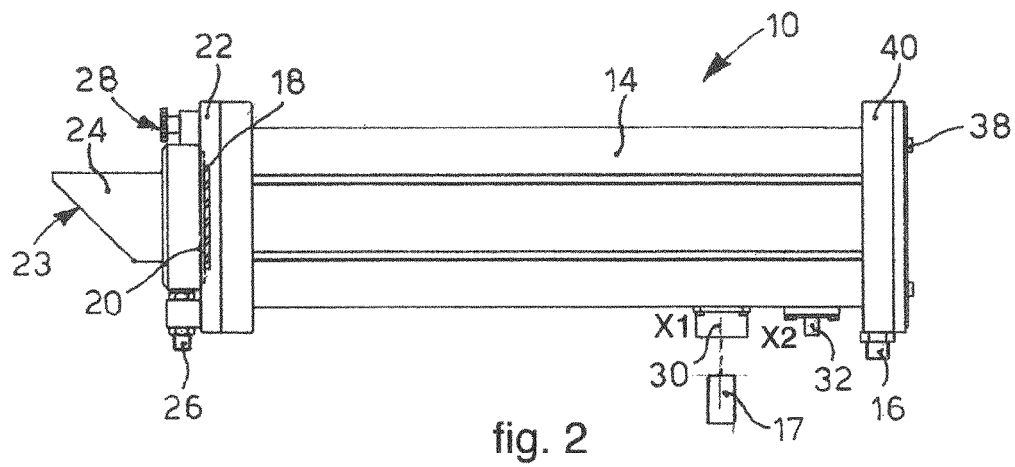
FIG. 2 is a lateral view of the device in FIG. 1.
Figure 3:
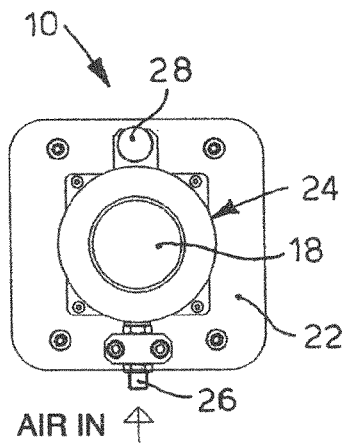
FIG. 3 is a front view of the device in FIG. 1.
Figure 4:
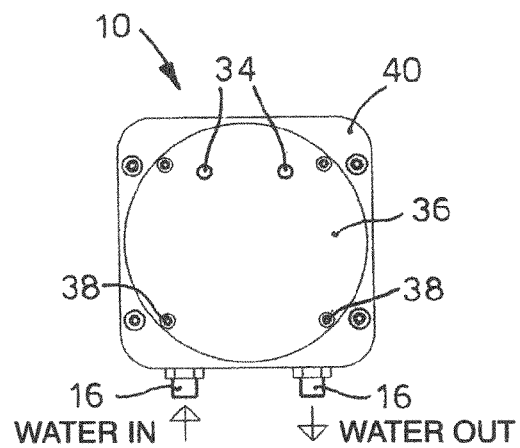
FIG. 4 is a rear view of the device in FIG. 1.

Since the environment where the device 10 is installed is very aggressive, in particular with regard to temperature, the container 14 is advantageously cooled by water, using a cooling jacket, the connections of which (inlet and outlet) are indicated by the reference number 16 in FIGS. 1, 2 and 4.

The container 14 has a glass window 18 at the front (FIGS. 1, 2 and 3), slightly larger in size than the field of vision associated with the camera 12, which substantially represents the eye with which the measuring device 10 observes the billet 15, or the product in general. A panel 20 (FIGS. 1 and 2) attaches the window 18 to a front flange 22 of the container 14 and is removable so that the glass of the window 18 can easily be replaced.

A hollow cylinder, or similar tubular element 24, is put in front of the window 18.

The hollow cylinder 24 is fed inside with compressed air, which enters through an inlet connection indicated by the reference number 26. The hollow cylinder 24 also has holes 27 for the air to pass through (FIGS. 1 and 2).

The hollow cylinder 24 has the double function of preventing the infrared radiation arriving from zones of the billet 15 extraneous to the measurement area from reaching the camera 12 and heating it, and also of keeping clean the optical path between the billet 15 and the window 18, thanks to the compressed air that is supplied. To facilitate the cleaning of the window 18, the hollow cylinder 24 is easily removable, unscrewing a screw with a knob 28 that attaches it to the front flange 22, and removing it from above.

In the form of embodiment shown in FIG. 1, the hollow cylinder 24 has a shaped end inclined upward with respect to the normal positioning of the device 10. This has the advantage that it limits the accumulation of dust inside the hollow cylinder 24. Indeed, in some installations of the invention, the device 10 can be positioned inclined and this would entail an increase in the accumulation of dust, detritus or other inside the hollow cylinder 24, if its end were conformed straight. The inclined end 23 obviates this problem and substantially represents a barrier against the entrance of dust.

The detection action of the camera 12 can be assisted, for example in the case of billets or other "cold" cast products, by lighting means, specifically designed to illuminate the moving product and to compensate for the fact that it does not emit infrared radiations, or only emits low radiations. In particular, in some forms of embodiment, the device 10 comprises auxiliary lighting means, in this case LEDs 29 positioned between the lens 25 and the window 18, by means of which the billet 15, or other moving product to be analyzed, can be illuminated in a supplementary manner, so as to compensate for the possible low emission of infrared radiations.

Below the container 14 as in FIGS. 1 and 2, or laterally to it, a first connector 30 is provided which allows the electric feed of the device 10 and the connection of the I/O signals, including the outlet that supplies the train of impulses representing the measurement of speed/length.

In particular, the first connector 30, in this case male with 9 poles, provides the 24Vdc feed, the incremental encoder outlet in quadrature, electric standard RS422 (ENC), digital inlets, digital outlets and Fast Ethernet.

The ENC outlet represents the result of the measurement made by the device 10 and since it is the incremental encoder in quadrature type, it also allows to detect the direction of movement.

It is enough to connect the ENC outlet to a card able to count the impulses produced by the generator 13, or to measure the frequency thereof.

In some forms of embodiment, the count of the impulses represents the length of the material and therefore the device 10 can advantageously also directly replace the encoders mounted on the rollerways that draw the billets.

In some forms of embodiment, the frequency of the impulses produced by the generator 13 represents the mode in which the speed of the billet 15 is made available outside the device 10.

For example, if the billet 15 moves at a speed of 20 mm/s and the resolution of the ENC outlet is 0.1 mm/impulse, the value of 20 mm/s corresponds to 200 impulses/s. Counting the impulses will lead to a value that will increase by 200 units every second. For example, after 2 seconds, the counter will reach 400, indicating that 40 mm of material have passed in front of the device 10.

To measure the frequency, suitable cards can be used that directly supply the frequency value, or the counter 17, which is read and zeroed cyclically, for example every second. In the example quoted, at the end of every second, the result of the count will be 200, indicating that the speed is equal to 20 mm/s.

Moreover, a second Profibus connector 32 (Profibus-DP port) may optionally be provided too, which allows to read the result of the measurement directly, without measuring the frequency of the impulses. A conversion block 31 carries out the conversion from standard serial signal line to Profibus.

The second connector 32 allows access from outside, for example by means of a PLC directly to the following data: speed, length of the billet, quality index of the measurement, etc., and alarms. At the rear, the container 14 may have state signaling LEDs 34, for example to indicate whether the device 10 is switched on or off, if it is functioning normally, if there is a temperature alarm, if the product to be measured is there, and other.

Furthermore, the container 14 is provided at the rear with a protection panel 36 (FIG. 4); by removing it and unscrewing attachment screws 38 that attach the panel 36 to a rear flange 40, it is possible to access inside the device 10.

Figure 5:
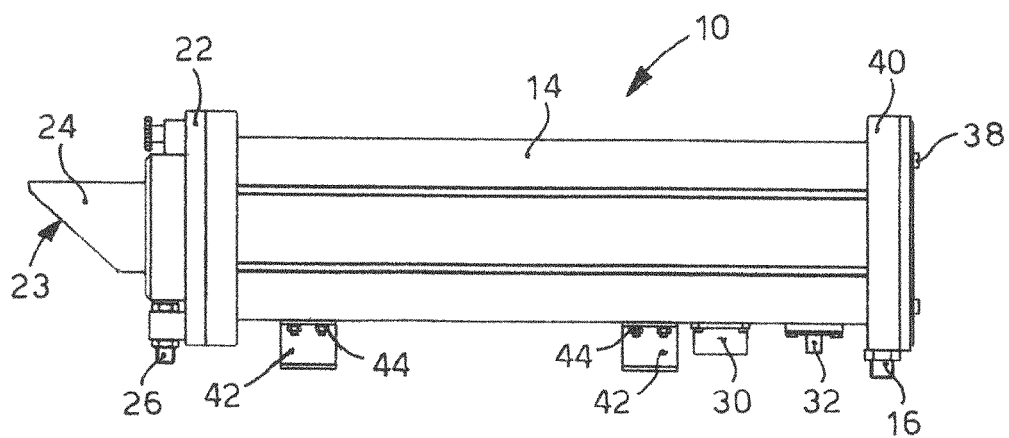
FIG. 5 is a lateral view of a variant of the device according to the present invention.

FIG. 5 shows a variant embodiment which provides omega shaped brackets 42 that allow to attach the device 10 simply on a support base. The omega shaped brackets 42 are attached by screws 44 to the lower side of the container 14.

Figure 6:
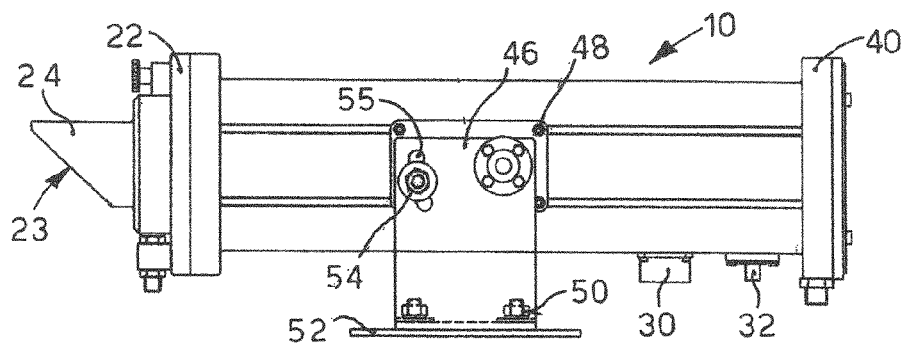
FIG. 6 is a lateral view of another variant of the device according to the present invention.

FIG. 6 shows a variant embodiment which provides an adjustable attachment support 46, attached by screws 48 to the lateral walls of the container 14. The support 46 is provided with two curvilinear eyelets 55, of which only one is visible in the drawings, which allow to fine adjust and set the orientation of the device 10, in both a horizontal direction, using clamping nuts 50 on the base 52, and also vertical, using clamping screws 54.

Figure 7:
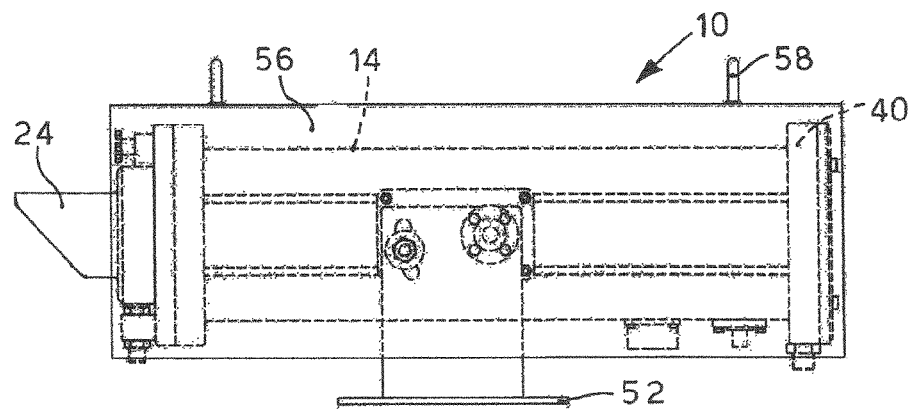
FIG. 7 is a lateral view of another variant of the device according to the present invention.

FIG. 7 shows a solution in which the container 14 is protected by a guard 56 against the hot radiations of the billet 15 and the dirt. The guard 56 is provided with handles 58 so that it can easily be removed.

The device 10 is normally installed at the side of the casting line, so that its direction of orientation is as orthogonal as possible, preferably within ±3°, to the direction of movement of the material.

To obtain the greatest reliability in measuring, the device 10 is preferably located at a suitable distance from the billet 15, and must be correctly oriented.

Figure 8:
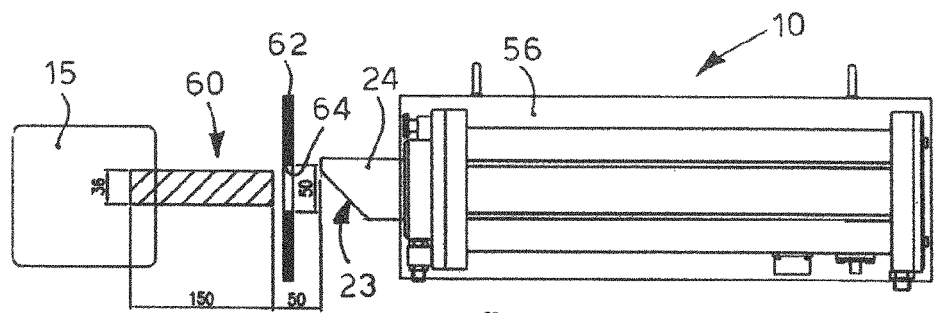
FIG. 8 is a lateral schematic representation of the field of vision of the device according to the present invention.

The camera 12 in the container 14 is configured to determine a single field of vision 60, through which the camera 12 is able to observe a surface portion of the billet 15, rectangular in shape, for example with a width and height of 48×36 mm, advantageously smaller in size that the local area of the billet 15 in transit, and with a depth correlated to the distance between the measuring device 10 and the billet 15 (FIGS. 8 and 9).

In some forms of embodiment, the image is in focus if the distance between the front side of the device 10 and the surface of the billet 15 is included in a determinate range correlated with the characteristics of the lens of the camera 12, for example between 50 and 200 mm (in FIG. 8 the value is shown of 150 mm as an example). In order for the device 10 to operate correctly, the distance must preferably be maintained in the desired range of values and therefore the surface of the billet 15 must never be too close or too distant.

The movement characteristics of the billet 15 can be analyzed and determined with reference to any surface of the billet 15 that passes through the field of vision 60. Indeed, the field of vision 60 determined by the camera 12 is such that the measurement of the movement characteristics of the billet 15 with the device 10 can be done wherever the surface of the billet 15 to be observed is, comprised in the height and width of the field of vision 60; that is, the device 10 is able to analyze any desired surface of the billet 15 in any position included in the field of vision 60.

As we said, the container 14 can be cooled with water and also has the protective guard 56. However, it is advantageous to provide in any case an additional screen 62, near the billet 15, so that the great heat irradiated by the billet 15 does not reach the device 10.

The screen 62, for example consisting of the wall of the rollerway that transports the billet 15, has an aperture 64, for example made using a blowtorch, through which the device 10 can see the billet 15. In some forms of embodiment, the minimum sizes of the aperture 64 are equal to the sizes of the field of vision 60 of the camera 12 (48×36 mm).

However, it is convenient if the aperture 64 is bigger, for example 60×50, otherwise the orientation would become too difficult (FIGS. 8 and 9).

With reference to FIG. 10, two successive images A, B are shown, detected by the camera 12 of the device 10 of a billet 15 moving in the direction indicated by the arrow F.

As can clearly be seen, the images A, B are at least partly superimposed, since the image B at least partly comprises what is framed in image A, so that it is possible to select a common detail P present in both images A, B. In particular, the same detail P can be identified, appearing in positions $s_A$, $s_B$ that are slightly different in the two images A, B acquired at successive moments $t_A$, $t_B$. The successive images A, B are correlated and the displacement of the product 15 is calculated based on the displacement of the detail P, suitably chosen, between the two images A, B from $P(t_A, s_A)$ to $P(t_B, s_B)$. In some forms of embodiment, the detail P is chosen from the details naturally present on the surface of the product, due to the scale or dis-uniformity of the surface temperature.

Figure 11:
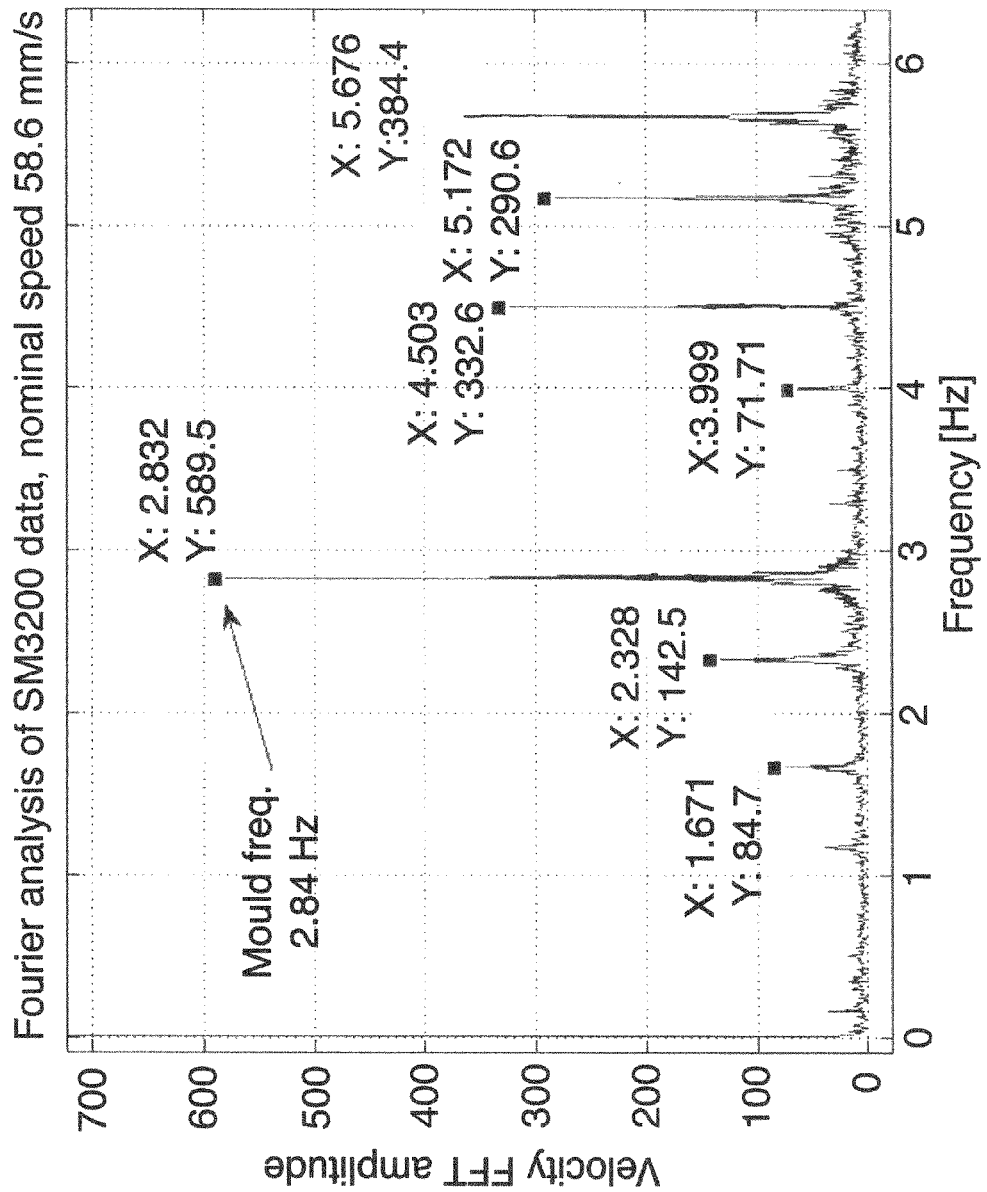
FIGS. 11 and 12 are graphs of the harmonic content of the speed signal for the diagnosis of a casting process obtainable using the device to analyze and determine the movement characteristics of oblong products according to the present invention.
Figure 12:
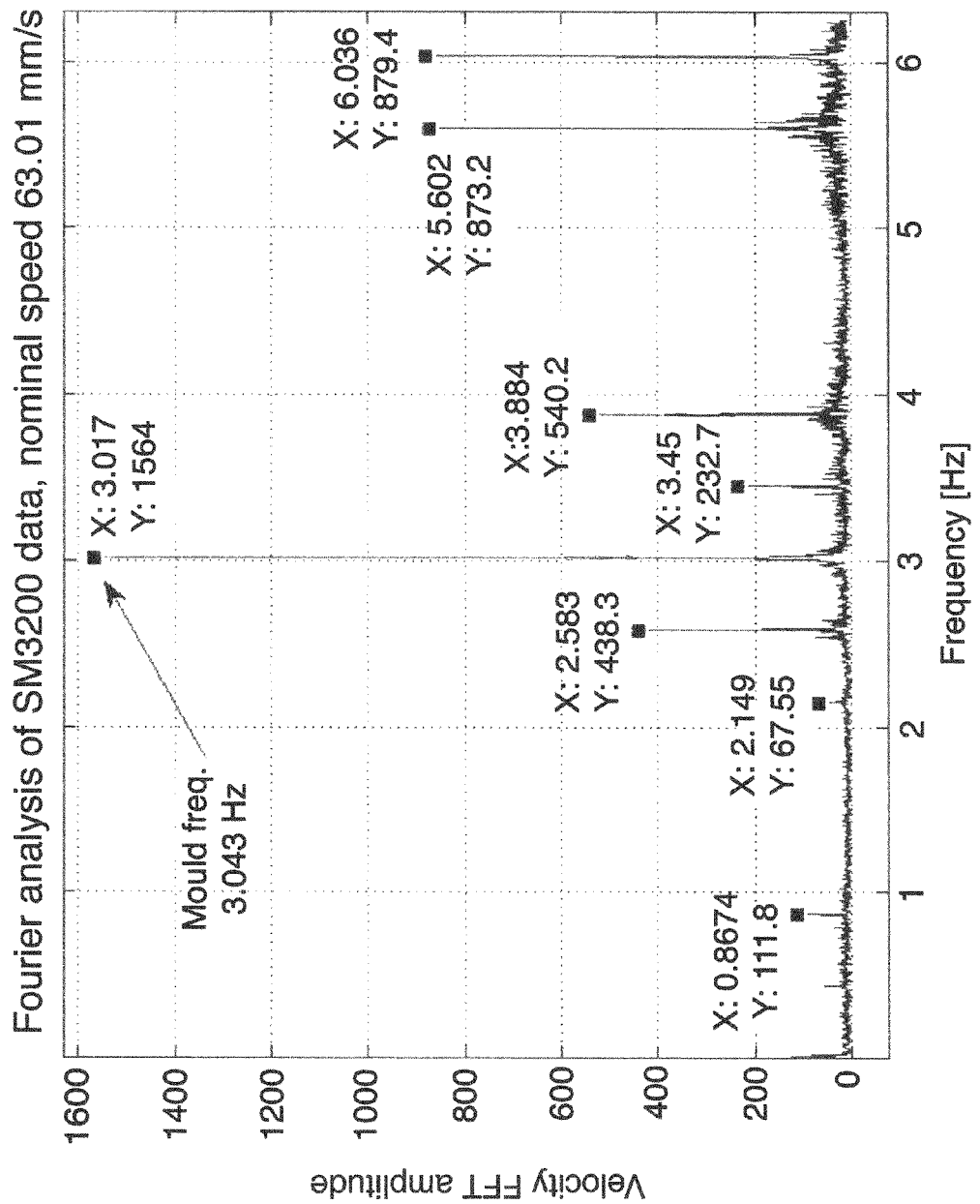

FIGS. 11 and 12 show how the present invention can be used for diagnostic purposes of the casting process, by carrying out a Fourier harmonic analysis (Fast Fourier Transform, FFT) in the frequencies domain of the speed signal (FIG. 11 speed measured 58.6 mm/s, FIG. 12 speed measured 63.01 mm/s) obtained by the device 10, analyzing both the component in the direction of feed and also the component perpendicular to it. By analyzing the graphs it is possible to identify, using the processor 11, the presence of a frequency component, shown by the arrows in each of the two drawings, corresponding to the oscillation frequency of the mold and, by assessing the amplitude, to identify in this way the presence of possible anomalies, in particular due to the erroneous setting of the casting speed, erroneous conicity of the crystallizer and/or poor effectiveness of the lubrication, or again other anomalies in the movement dynamics of the cast product, such as the misalignment of the mold which causes friction downstream of casting.

Furthermore, again thanks to the processor 11, suitably configured, it is possible to identify, from the harmonic analysis, the presence of a frequency component in the direction of feed, or in the direction transverse to the direction of feed, correlated to friction and/or anomalies in the mechanical system, typically the feed rolls, which guides and conveys the cast product.

For example a facetted idle roll may determine anomalies in movement in the direction transverse to the direction of feed, and such anomalies, with the present invention, are effectively identified using the harmonic analysis as described above.

The following cases, to give a non-restrictive example, come within the case record of friction and/or anomalies in the mechanical system: the case of a facetted roll, or the case of roll chafing, for example due to a protuberance caused by a residue of steel on its surface, which can produce identifiable frequencies because they are associated with the rotation period of the roll, or again the case of roll blocking, which will produce a frequency spectrum that can easily be distinguished from the previous case.

The invention claimed is:
1. A device to analyze and determine the movement characteristics of products exiting from a casting line and moving in a determinate direction of feed (F) and emitting radiations, the device being configured to be disposed at one side of the casting line to acquire images of the products, the device comprising:
   a camera able to continuously acquire images of the product moving in the direction of feed (F) in at least two successive instants of time;
   an electronic processing unit, suitable to effect a comparison between at least two successive images acquired, using mathematical algorithms based on an image correlation principle, in order to determine a spatial displacement of the images and, by said spatial displacement, to analyze and determine the movement characteristics of the product moving in the direction of feed (F), or the direction transverse to the direction of feed, obtaining a signal correlated to the speed of the moving product, wherein said processing unit is configured to carry out a Fourier harmonic analysis by Fast Fourier Transform of a speed signal and to analyze the speed signal in a frequencies domain, both in the direc- tion of feed (F) and also in the direction transverse to the direction of feed, so as to identify:

the presence of a frequency component corresponding to the frequency of oscillation of an ingot mold of the casting line and, assessing the amplitude of said frequency component identified, to identify the presence of possible anomalies, in particular due to an erroneous setting of a casting speed, erroneous conicity of a crystallizer and/or poor effectiveness of lubrication, or anomalies in the movement dynamics of the product, and/or the presence of a frequency component correlated to friction and/or anomalies in a mechanical system, that guides and conveys the product; and an impulse generator which, to render a calculated speed value of the product available outside the camera, generates, depending on the speed calculated by the processing unit, a sequence of impulses with a frequency correlated to the value of the speed determined, impulse counter means being provided to count said impulses, from which the speed value is derived externally, wherein said processing unit is configured to perform said comparison on the basis of the natural presence of surface irregularities or dis-uniformities on the product, in which, among said surface irregularities or dis-uniformities, a reference detail (P) is identified in the images acquired, and the spatial displacement thereof is evaluated, comparing relative images by said mathematical algorithms based on the image correlation principle and then the movement characteristics of the product are analyzed and determined.

2. The device as in claim 1, wherein the two instants of time in which said images are acquired are such that the two images taken by the camera are at least partly superimposed, a second successive image containing at least a part of what was taken in a first previous image.

3. The device as in claim 1, wherein the processing unit is integrated into the camera.

4. The device as in claim 1, wherein the camera comprises an optical system provided with a lens of the telecentric type able to guarantee the independence of the measurement of the distance from the product.

5. The device as in claim 1, wherein the camera is configured to determine a single field of vision through which to observe and acquire images of a single portion of the product, corresponding to the area of the product moving in the direction of feed (F) seen by the camera and passing through said field of vision.

6. The device as in claim 5, wherein the field of vision is configured so that the portion of the product observed by the camera is of a rectangular shape.

7. The device as in claim 1, comprising auxiliary lighting means associated with the camera to compensate for any possible low temperature of the product moving in the direction of feed (F).

8. A device to analyze and determine the movement characteristics of products exiting from a casting line and moving in a determinate direction of feed (F) and emitting radiations, the device being configured to be disposed at one side of the casting line to acquire images of the products, the device comprising:

a camera able to continuously acquire images of the product moving in the direction of feed (F) in at least two successive instants of time;

an electronic processing unit, suitable to effect a comparison between at least two successive images acquired, using mathematical algorithms based on an image correlation principle, in order to determine a spatial displacement of the images and, by said spatial displacement, to analyze and determine the movement characteristics of the product moving in the direction of feed (F), or the direction transverse to the direction of feed, obtaining a signal correlated to the speed of the moving product, wherein said processing unit is configured to carry out a Fourier harmonic analysis by Fast Fourier Transform of a speed signal and to analyze the speed signal in a frequencies domain, both in the direction of feed (F) and also in the direction transverse to the direction of feed, so as to identify:

the presence of a frequency component corresponding to the frequency of oscillation of an ingot mold of the casting line and, assessing the amplitude of said frequency component identified, to identify the presence of possible anomalies, in particular due to an erroneous setting of a casting speed, erroneous conicity of a crystallizer and/or poor effectiveness of lubrication, or anomalies in the movement dynamics of the product, and/or the presence of a frequency component correlated to friction and/or anomalies in a mechanical system, that guides and conveys the product; and a Profibus port, or equivalent port, by which to access directly a speed value of the product calculated by the processing unit, wherein said processing unit is configured to perform said comparison on the basis of the natural presence of surface irregularities or dis-uniformities on the product, in which, among said surface irregularities or dis-uniformities, a reference detail (P) is identified in the images acquired, and the spatial displacement thereof is evaluated, comparing relative images by said mathematical algorithms based on the image correlation principle and then the movement characteristics of the product are analyzed and determined.

9. A method to analyze and determine the movement characteristics of products exiting from a casting line and moving in a determinate direction of feed (F) and emitting radiations, comprising:

acquiring, continuously and at successive instants of time, a plurality of images of the moving product whose movement characteristics are to be analyzed, wherein acquiring of images is performed at one side of the casting line, carrying out a comparison between at least two successive images acquired, using mathematical algorithms based on an image correlation principle, in order to determine a spatial displacement of the images and, by said spatial displacement, to analyze and determine the movement characteristics of the product moving in the direction of feed (F), obtaining a signal correlated to a speed of the moving product, wherein the method carries out a Fourier harmonic analysis by Fast Fourier Transform of a speed signal and analyzes said speed signal in a frequencies domain, both in the direction of feed (F) and also in the direction transverse to the direction of feed, so as to identify:

the presence of a frequency component corresponding to the frequency of oscillation of an ingot mold of the casting line and, assessing the amplitude of said frequency component identified, to identify the presence of possible anomalies, in particular due to an erroneous setting of a casting speed, erroneous conicity of a crystallizer and/or poor effectiveness of lubrication, and/or the presence of a frequency component correlated to friction and/or anomalies in a mechanical system that guides and conveys the product, the method further including generating, by an impulse generator and depending on the calculated speed of the moving product, a sequence of impulses with a frequency correlated to the value of the speed determined, in order to render a calculated speed value of the product available outside the camera, an impulse counter means being provided to count said impulses, from which the speed value is derived externally, and wherein the comparison step is carried out on the basis of the natural presence of surface irregularities and dis-uniformities on the product, in which, among said surface irregularities and dis-uniformities, a reference detail (P) is identified in the images acquired, and the spatial displacement thereof is evaluated, comparing the relative images by said mathematical algorithms based on the image correlation principle and then the movement characteristics of the product are analyzed and determined.

10. A method to analyze and determine the movement characteristics of products exiting from a casting line and moving in a determinate direction of feed (F) and emitting radiations, comprising:

acquiring, continuously and at successive instants of time, a plurality of images of the moving product whose movement characteristics are to be analyzed, wherein acquiring of images is performed at one side of the casting line, carrying out a comparison between at least two successive images acquired, using mathematical algorithms based on an image correlation principle, in order to determine a spatial displacement of the images and, by said spatial displacement, to analyze and determine the movement characteristics of the product moving in the direction of feed (F), obtaining a signal correlated to a speed of the moving product, wherein the method carries out a Fourier harmonic analysis by Fast Fourier Transform of a speed signal and analyzes said speed signal in a frequencies domain, both in the direction of feed (F) and also in the direction transverse to the direction of feed, so as to identify:

the presence of a frequency component corresponding to the frequency of oscillation of an ingot mold of the casting line and, assessing the amplitude of said frequency component identified, to identify the presence of possible anomalies, in particular due to an erroneous setting of a casting speed, erroneous conicity of a crystallizer and/or poor effectiveness of lubrication, and/or the presence of a frequency component correlated to friction and/or anomalies in a mechanical system that guides and conveys the product, the method further including directly accessing, by a Profibus port, or equivalent port, a calculated speed value of the product, and wherein the comparison step is carried out on the basis of the natural presence of surface irregularities and dis-uniformities on the product, in which, among said surface irregularities and dis-uniformities, a reference detail (P) is identified in the images acquired, and the spatial displacement thereof is evaluated, comparing the relative images by said mathematical algorithms based on the image correlation principle and then the movement characteristics of the product are analyzed and determined.

* * * * *